United States Patent
Karaoguz

(10) Patent No.: US 9,426,272 B2
(45) Date of Patent: *Aug. 23, 2016

(54) METHOD AND SYSTEM FOR A DIGITAL DIARY SYSTEM

(75) Inventor: Jeyhan Karaoguz, Irvine, CA (US)

(73) Assignee: Broadcom Corporation, Irvine, CA (US)

( * ) Notice: Subject to any disclaimer, the term of this patent is extended or adjusted under 35 U.S.C. 154(b) by 1010 days.

This patent is subject to a terminal disclaimer.

(21) Appl. No.: 13/534,995

(22) Filed: Jun. 27, 2012

(65) Prior Publication Data

US 2012/0266072 A1 Oct. 18, 2012

Related U.S. Application Data

(63) Continuation of application No. 12/132,323, filed on Jun. 3, 2008, now Pat. No. 8,223,799.

(60) Provisional application No. 60/943,162, filed on Jun. 11, 2007.

(51) Int. Cl.
*H04L 12/28* (2006.01)
*H04M 1/725* (2006.01)
(Continued)

(52) U.S. Cl.
CPC ......... *H04M 1/72522* (2013.01); *G06Q 10/109* (2013.01)

(58) Field of Classification Search
USPC ................................. 370/252, 329, 419, 490
See application file for complete search history.

(56) References Cited

U.S. PATENT DOCUMENTS

| | | | |
|---|---|---|---|
| 6,125,284 A | * | 9/2000 | Moore .................... G10L 15/02 455/557 |
| 6,442,691 B1 | | 8/2002 | Blandford |
| 8,010,579 B2 | * | 8/2011 | Metsatahti et al. ........... 707/805 |

(Continued)

OTHER PUBLICATIONS

Sony, SonyStyle USA, GPS Unit, Model No. GPS-CS1 KASP, webpage http://www.sonystyle.com/webapp/wcs/ stores/servlet/ProductDisplay?catalogId=1 0551&storeId=1 0151 &langId=-1 &XID=O:gps%2dcs 1 kasp:dg_pidf&kw=gps%2Dcs1kasp &Ip=8198552921665393607 &productId=8198552921665393607, 2008, 4 pages.

(Continued)

*Primary Examiner* — John Pezzlo
(74) *Attorney, Agent, or Firm* — Brinks Gilson & Lione

(57) ABSTRACT

A wireless communication device may generate an interactive digital diary for one or more users. The device may handle location information, multimedia data, transactions and/or secure communications via a plurality of technologies. Digital diary information may be stored internally or externally, it may be searchable and/or may comprise moving images, still images, audio, text, geographic location, entity information, time, date, transactions, financial information, consumer information, security information, user input, communications, user contacts, software applications, user profiles, scheduled events, prompts and/or reminders. The digital diary may comprise an interactive user interface which may have mapping capability and may provide link access to digital diary information and/or associated entities. User input methods may comprise screen touch, pressure sensor, key entry and/or voice. Information may be captured via a camera, microphone, geo-location data receiver, transaction write/reader, digital clock, digital calendar, key entry and/or tactile sensor.

20 Claims, 4 Drawing Sheets

(51) Int. Cl.
*G06Q 10/10* (2012.01)
*H04J 1/16* (2006.01)

(56) References Cited

U.S. PATENT DOCUMENTS

2003/0165319 A1 9/2003 Barber et al.
2011/0249591 A1 10/2011 Abdel-Kader et al.

OTHER PUBLICATIONS

Seagate Technology LLC, Seagate DAV.E. (Digital Audio Video Experience) Transform the consumer digital content experience with the Seagate DAV.E. design concept, Data Sheet, 2007, 2 pages.
Seagate Technology LLC, Seagate DAV.E. (Digital Audio Video Experience) The portable storage platform that collects, plays and manages digital content, Product Overview, 2007, 2 pages.

* cited by examiner

METHOD AND SYSTEM FOR A DIGITAL DIARY SYSTEM

CROSS REFERENCE TO RELATED APPLICATIONS

This application is a continuation of application Ser. No. 12/132,323, filed Jun. 3, 2008, entitled "Method and System for a Digital Diary System," pending, which claims the benefit of U.S. Provisional Application Ser. No. 60/943,162, filed on Jun. 11, 2007, entitled "System And Method For A Location-Based Digital Diary,", which applications are incorporated herein in their entirety by this reference.

This application also makes reference to:

U.S. application Ser. No. 11/861,224, filed on Sep. 25, 2007, entitled "Method and System for Creating a Personalized Journal Based on Links to Information and Analyzing Those Links for Later Retrieval," issued as U.S. Pat. No. 8,027,668 on Sep. 27, 2011.

U.S. application Ser. No. 11/968,560, filed on Jan. 2, 2008, entitled "Method and System for Utilizing Context Data Tags to Catalog Data in a Wireless System," pending.

U.S. application Ser. No. 11/864,202, filed on Sep. 28, 2007, entitled "Method and System for Tagging Data with Context Data Tags in a Wireless System," pending.

U.S. application Ser. No. 11/864,255, filed on Sep. 28, 2007, entitled "Method And System For Utilizing And Modifying User Preference Information To Create Context Data Tags In A Wireless System," pending.

U.S. application Ser. No. 11/864,383, filed on Sep. 28, 2007, entitled "Method and System for Utilizing Positional Information of Tagged Data When Processing Information in Wireless Devices," pending Each of the above-referenced applications is hereby incorporated herein by reference in its entirety.

TECHNICAL FIELD

Certain embodiments of the invention relate to multimedia communication. More specifically, certain embodiments of the invention relate to a method and system for a digital diary system.

BACKGROUND

The field of wireless communication has seen dramatic growth the last few years. In today's world, most people use their portable devices, be it cellular phones, PDA's, laptops, media players and/or other devices, for various purposes, including business and personal, on a constant and daily basis. Increasingly, people are able to access information according to their individual choice. For instance people may select music or videos from an electronic media store of their choice and play them on portable devices. In addition, the Internet allows people to access news and information at a time convenient for them rather than at specified broadcast times. In addition, many wireless solutions have been introduced, and have made tremendous strides into everyday life.

For example, the use of Wireless Personal Area Networks (WPAN) has been gaining popularity in a great number of applications because of the flexibility and convenience in connectivity they provide. WPAN systems generally replace cumbersome cabling and/or wiring used to connect peripheral devices and/or mobile terminals by providing short distance wireless links that allow connectivity within very narrow spatial limits (typically, a 10-meter range). WPAN may be based on standardized technologies, for example Class 3 Bluetooth (BT) technology. While WPAN may be very beneficial for certain applications, other applications may require larger service areas and/or capabilities.

To satisfy such needs, other technologies have been developed to provide greater wireless service. Wireless Local Area Networks (WLAN) systems may operate within a 100-meter range, for example. In contrast to the WPAN systems, WLANs provide connectivity to devices that are located within a slightly larger geographical area, such as the area covered by a building or a campus, for example. WLAN systems are generally based on specific standards, for example IEEE 803.11 standard specifications, and typically operate within a 100-meter range, and are generally utilized to supplement the communication capacity provided by traditional wired Local Area Networks (LANs) installed in the same geographic area as the WLAN system.

Other wireless solutions have evolved from traditional land-based communication technologies. For instance, cellular phones have become just about an absolute necessity in today's world. While cellular technology was merely intended to add an element of mobility to the traditional telephony service, this technology has grown beyond that initial purpose. Many modern cellular technologies, including such technologies as GSM/GPRS, UMTS, and CDMA3000 may incorporate substantial data capabilities. Most of today's cellular services may include such features as text messaging, video streaming and/or web browsing.

Further limitations and disadvantages of conventional and traditional approaches will become apparent to one of skill in the art, through comparison of such systems with the present invention as set forth in the remainder of the present application with reference to the drawings.

SUMMARY

A system and/or method for a digital diary system, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

BRIEF DESCRIPTION OF THE DRAWINGS

The innovation may be better understood with reference to the following drawings and description. In the figures, like reference numerals designate corresponding parts throughout the different views.

DETAILED DESCRIPTION

Figure 1A:
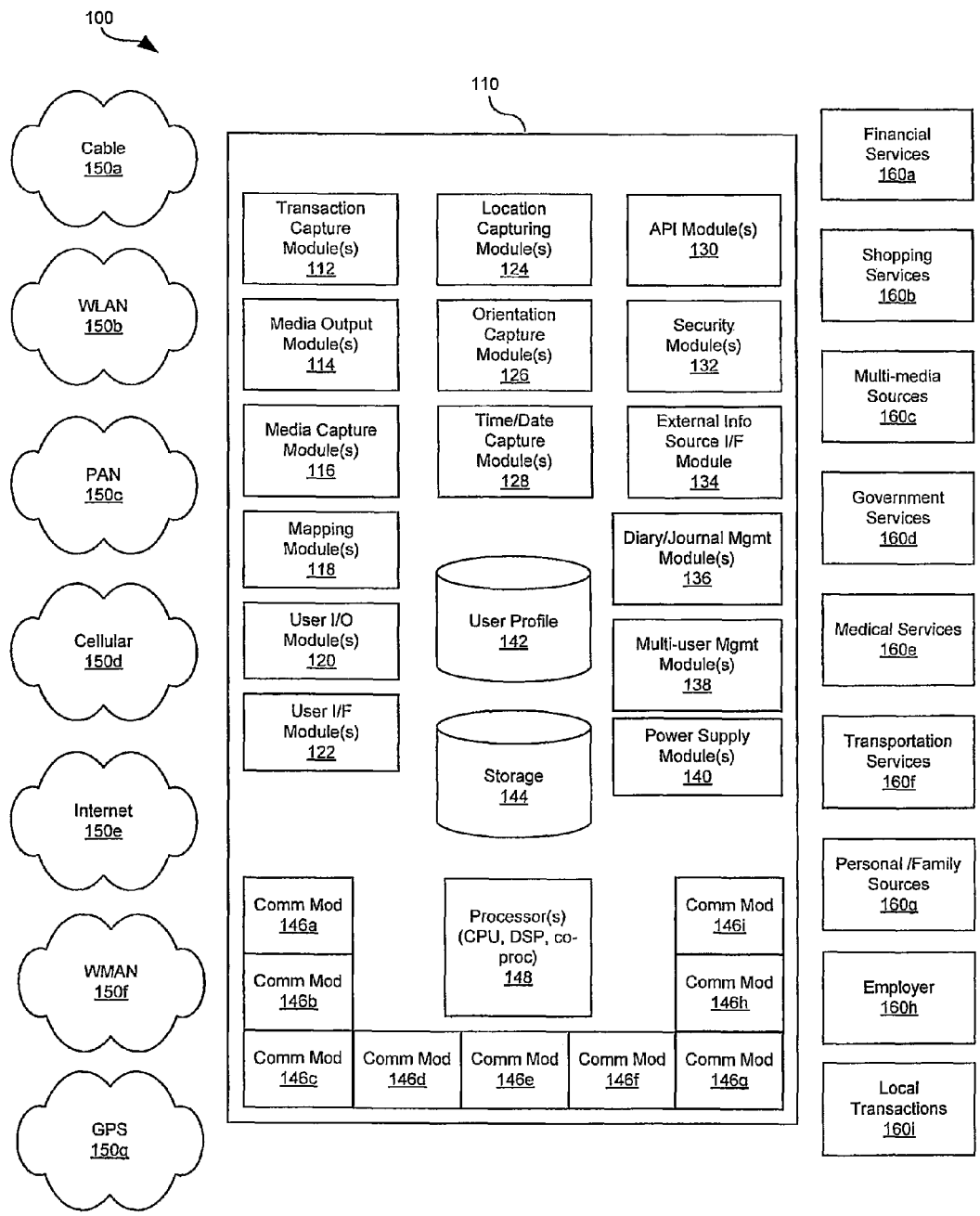
FIG. 1A is a block diagram of an exemplary system and/or multi-media device enabled to provide a digital diary system, in accordance with an embodiment of the invention.

Aspects of the invention may be found in a method and system for a digital diary system. A wireless communication device may generate and/or process multimedia information. In addition, the wireless communication device may be operable to determine its location, for example, a location where the multi-media generation and/or processing occurs. Moreover, the wireless communication device may generate an interactive digital diary that comprises a plurality of digital diary records. Accordingly, digital diary records may be generated based on default settings, a stored user profile and/or ad hoc user input, for example. The interactive digital diary may associate and/or link the generated and/or processed multimedia information with the determined location information or an identified location. The digital diary records may comprise, for example, moving images, still images, audio, text, geographic location, entity information, time, date, transactions, financial information, consumer information, security information, user input, communications, links, user contacts, software applications, user profiles, scheduled events, prompts and/or reminders. Furthermore, information for the digital diary records may be stored within the wireless communication device and/or external to it.

The interactive digital diary and/or information corresponding to one or more links associated with one or more digital diary records may be presented via a user interface displayed on the wireless communication device. In this regard, the user interface may present the interactive digital diary and/or the information corresponding to one or more links associated with one or more digital diary records within various contexts, for example, within maps, time frames, narrative, collage, voice, audio, video, text, data, icons, charts, and tables. The time frames may comprise calendars and/or time lines for example. Also, the user interface may enable display of one or more links and/or icons that may provide access to one or more external entities, networks, servers, applications and contacts. Moreover, the user interface may accept user input via one or more of a plurality of methods comprising screen touch, pressure sensor, key entry and voice. In this manner, associating and/or linking information for the interactive digital diary may utilize metadata, tags and/or designations In accordance with an embodiment of the invention, information for the digital diary records may be communicated and/or updated via one or more of a plurality of wireless, optical and/or wired communication technologies. In addition, digital diary records may be searchable based on one or more criteria comprising time, date, geographic location, entity, contact and user identity, for example. Access to the digital diary records may involve authentication and communication of digital diary records using encryption and/or decryption. Multi-media, which comprising voice, audio, still and/or moving images and/or text, for example, may be captured utilizing one or more of a camera, microphone, geo-location data receiver, transaction write/reader, digital clock, digital calendar, key entry, tactile sensor. In various embodiments of the invention, financial and/or security transactions based on one or more digital diary records may be executed within the interactive digital diary. The interactive digital diary may enable a user to capture, process, access and/or update.

FIG. 1A is a block diagram of an exemplary system and/or multi-media device enabled to provide a digital diary system, in accordance with an embodiment of the invention. Referring to FIG. 1A there is shown a non-limiting digital diary system 100 comprising a non-limiting plurality of communication protocols and networks comprising cable 150a, WLAN 150b, PAN 150c, Cellular 150d, Internet 150d, WMAN 150f and GPS 150g, a plurality of non-limiting electronic resources financial services 160a, shopping services 160b, multi-media services 160c, government services 160d, medical services 160e, transportation services 160f, personal/family sources 160g, employer 160h and local transaction sources 160i. In addition, the digital diary system 100 may comprise a multi-media device 110 wherein a plurality of hardware/software modules may comprise one or more of transaction capture module(s) 112, media output module(s) 114, media capture module(s) 116, mapping module(s) 118, user I/O module(s) 120, user interface module(s) 122, location capture module(s) 124, orientation module(s) 126, time/date capture module(s) 128, API module(s) 130, and security module(s) 132. The digital diary system 100 may also comprise an external information source interface module(s) 134, diary management module(s) 136, multi-user management module, power supply module, user profile 142, internal and/or external storage module(s) 144, one or more processors 148 and/or a plurality of communication modules 146a through 146i.

The multi-media device 110 may comprise suitable logic, circuitry and/or code that may be a mobile or portable device that may be a part of or may comprise characteristics and/or features of one or more computing devices and/or one or more communication devices. Exemplary computing devices and/or communication devices may comprise a mobile phone, a handheld or installed geo-location and/or mapping device, a portable computer, a personal digital assistant, a media player for audio, video and/or still imagery, a media recorder for audio, video and/or still imagery, a transaction device for commercial or financial exchanges, a portable email device and/or Internet access device. In this regard, the multi-media device 110 may communicate via one or more communication modules 146a through 146i which may be adapted to establish and/or maintain communication over one or more of a plurality of protocols and networks, for example, 150a through 150g. The one or more communication modules 146a through 146i may communicate via one or more of wireless, wire-line, optical and/or backplane technology, for example. Notwithstanding, the invention is not limited to utilization of any specific type of communication protocol and/or network and may utilize any suitable communication technology.

The multi-media device 110 may comprise suitable logic, circuitry and/or code that may be enabled to communicate with one or more of a plurality of resources, for example, 160a through 160i. The one or more of the plurality of resources may be communicatively coupled and or networked with the multi-media device 110. The plurality of resources, for example 160a through 160i may communicate with and/or provide information for the multi-media device 110. In this regard, the multi-media device 110 may communicate with and/or link to external entities, contacts and/or users of the digital diary system 100 for example.

The multi-media device 110 may comprise suitable logic, circuitry and/or code that may comprise a plurality of hardware and/or software modules that are operable to implement a digital diary. For example, the plurality of hardware/software modules may enable the multi-media device 110 to utilize and/or associate event information, media, location, time, date and/or user input to create a digital diary entry and/or manage the digital diary. The multi-media device 110 may gather and/or log information and/or manage the digital diary independently or may be communicatively coupled with other devices. For example, the digital diary may be running on a first multi-media device 110 while a second device may capture information, for example, media data and may communicate and/or manage the information for the first multi-media device 110. In this regard, various hardware/ software modules may be external to the multi-media device 110 and/or distributed within a communication network.

The transaction capture module(s) 112 may comprise suitable logic, circuitry and/or code that may be operable to capture transactions that a user and/or the multi-media device 110 may conduct. For example, financial, commercial and/or physical access transactions may be captured. Exemplary captured transactions wherein the multi-media device 110 may be utilized to handle the transaction may comprise a credit or debit purchase, a banking transaction over the phone, purchase and/or download of music and/or entry into a secure building. The transaction module(s) 112 may capture various information associated with a transaction, for example, product or service information, price, vendor, parties or entities involved, tax information, account numbers, security information, time, date and/or location of a transaction. In various embodiments of the invention, the multi-media device 110 may enable a transaction by communicating transaction information with another device. In addition, transaction records may be associated with other digital diary information.

The media output module(s) 114 may comprise suitable logic, circuitry and/or code that is operable to provide digital diary information output functionality. For example, the media output module(s) 114 may be enabled to recall, for example, media, text, user input and/or transaction information based on associated information, for example, one or more of text, a time or time duration, date, location, an external entity such as an establishment, a contact, user and/or an event. In various embodiments of the invention, the output module(s) 114 may be adapted to display a map comprising hyperlinks and/or icons associated with the digital diary information.

The media capture module(s) 116 may comprise suitable logic, circuitry and/or code that is operable to create and/or acquire media data that may be associated with other digital diary information and/or entered into the digital diary. For example, the media capture module(s) may generate, receive, process and/or store one or more of text, audio, still digital images and/or video data. In some embodiments of the invention, the media capture module(s) 116 may communicate media data with other hardware/software modules and/or media devices. In addition, media data from external sources may be utilized.

The mapping module(s) 118 may comprise suitable logic, circuitry and/or code that is operable to acquire location information and generate and/or display maps. The location information may be associated with digital diary information and the maps may indicate locations significant to digital diary information. In various embodiments of the invention, a map may comprise hyperlinks and/or icons linked with associated digital diary information.

The user I/O module(s) 120 may comprise suitable logic, circuitry and/or code that is operable to accept and/or provide user input for the digital diary. For example, the user I/O module(s) 120 may receive information entered via a user interface for use in a digital diary entry and/or for associating various digital diary information.

The user interface module(s) 122 may comprise suitable logic, circuitry and/or code that enables a user to interact with and/or communicate with the multi-media device 110 in a plurality of ways. For example, the user interface may display visual and/or audio output from the digital diary and may receive input from the user. For example, the user interface module(s) 122 may be adapted to receive user input via one or methods, for example, motion, tactile or pressure assertions, voice or audio, key entry, RF ID and/or other machine readable representations and/or a tethered or wireless device such as a mouse. In addition the user interface module(s) 122 may enable launching and/or communicating with various software/hardware modules, applications, operations or commands that may be internal to the multi-media device 110 or on an external device. In various embodiments of the invention, the user interface module(s) 122 may enable web browsing and/or user manipulation of access to networked or peer to peer devices and/or applications. Moreover, the user interface module(s) 122 may enable a user to search, organize and/or review digital diary information.

The location capture module(s) 124 may comprise suitable logic, circuitry and/or code that is operable to acquire, process and/or generate location information which may be associated with other digital diary information. In this regard, the location capture module(s) 124 may be operable receive geolocation data from a global navigation satellite system such as GLONASS, GPS, and/or Galileo to capture location information. Moreover, the location information may be received from a network such as a cellular network and/or a local device or network. In some embodiments of the invention the location capture module(s) may determine a location based on received location information and triangulation or time-distance of arrival data. Moreover, a user may provide input with regard to location. For example, a user may select a position on a map. The invention is not limited to a specific location technology and/or method and may utilize any that are suitable for location determination. The location capture module(s) 124 may function based on a user request or may operate in the background, for example, routinely or based on requests from other modules and/or applications. The orientation capture module(s) 126 may comprise suitable logic, circuitry and/or code that is enabled to provide orientation information such as pointing based on one or more methods and/or technologies, for example, a compass, gyroscope, wireless communication and/or user input. The orientation information may be associated with other digital diary information and may be utilized by the mapping module(s) for example.

The time/date capture module(s) 128 may comprise suitable logic, circuitry and/or code that is operable to utilize an internal clock and/or colander as well as external and/or network sources of time and/or date information to provide the digital diary with time and/or date information. In this regard, the time/date information may be utilized by other modules and may be associated with other digital diary information.

One or more application interface modules (API) 130 within the multi-media device 110 may be operable to interface with software and/or hardware applications that may execute on the multi-media device 110 or within the digital diary system 100. In this regard, the digital diary hardware and/or software modules may be communicatively coupled with various other applications. Exemplary hardware/software applications that the API module(s) 130 may interface with may comprise finance software, travel expense software, personal expense accounts, tax software, a browser application and/or email.

The security module(s) 132 enable secure access and/or secure communication with the multi-media device 110. The security module(s) 132 may be operable to handle a plurality of security functions that may protect information on the multi-media device 110. In addition, the security module(s) 132 may be operable to comply with secure access and/or secure transfer of data managed by other devices or systems. Exemplary security methods comprise user and/or device authentication, public key infrastructure and/or digital signatures, data encryption/decryption and/or digital rights management.

The external information source module(s) 134 may comprise suitable logic, circuitry and/or code that is operable to seek and acquire various types of information through one or more communication networks. For example, the external information source module(s) 134 may seek information for the digital diary from the internet, a private network and/or a peer device. In this regard, the external information source module(s) 134 may seek information from one or more of the resources 160a through 160i. In various embodiments of the invention, the digital diary may receive updated data from one or more resources such as 160a through 160i when digital diary information has become obsolete and/or new information associated with digital diary information is available. For example, the external information source module(s) 134 may seek availability of an item or a change in price from a store or financial institution.

The diary management module(s) 136 may comprise suitable logic, circuitry and/or code that organizes and/or manages digital diary information for accessing, updating, outputting and/or processing the digital diary information. In this regard, the diary management module(s) 136 may associate and/or group various stored, linked and/or accessible digital diary information to form a digital diary entry record. For example, events transactions, media and/or user input may be associated based on one or more factors such as date, time, location, orientation, user, contact, event and/or entity involved. Accordingly, digital diary information may be "stamped" with date, time, location, orientation, user, contact, event and/or entity involved, for example. In addition, a plurality of entries and/or records may be associated according to a specified theme or a shared factor. For example, a diary of vacation related entries or a series of purchases or transactions of a certain type or with a specified entity may be grouped or associated. In addition, the diary management module(s) 136 may request, receive and/or respond to user input with regard to user preferences for diary management, information input and/or information associations and/or information queries for example. In this regard, the diary management module(s) 136 may enable linking, storing, associating, organizing and/or outputting digital diary information.

The diary management module(s) 136 may comprise suitable logic, circuitry and/or code that may be operable to determine and/or manage how digital diary information may be displayed. For example, events and/or transactions may be displayed on a map with links and/or icons to digital diary information associated with a particular location. Events and/or transactions may also be charted over time, for example, in a calendar or time line with links to associated digital diary information. Text and or multi-media may also be utilized to represent a digital diary and may provide links to associated information. Presentation of digital diary information may be managed by default parameters and/or may be based on an application, user input and/or a user profile, for example.

The multi-user management module(s) 138 may comprise suitable logic, circuitry and/or code that enables a plurality of users to access, manage and/or utilize a multi-media device 110 and/or system 100. In this regard, the multi-user management module(s) 138 may enable protected access to the device and/or digital diary information along with the security module(s) 132. In addition, the multi-user management module(s) 138 may tailor and/or adapt digital diary functionality and/or appearance according to a user's preferences. For example, user preferences may indicate within a user profile for one or more users via the user interface module(s) 122. The user preferences may determine which information is utilized and how information is associated and/or presented for example.

The power supply module(s) 140 may comprise its own power source, for example, rechargeable batteries and/or may receive and/or utilize power from an external source.

The user profile module(s) 142 may comprise user specific preferences for digital diary functionality and/or appearance or presentation of digital diary output for one or more users. For example, the user profile module(s) 142 may comprise user input regarding collection of digital diary information and/or associations to be made between various digital diary information and/or other available data such as time, date and/or location. For example, a user profile may define a specific diary that a user may wish to create, display and/or interact with, for example, a photo album, a documentary movie, a contact list, daily journal, travel log, business and/or transaction record. The user may specify types of media, transactions, user input to collect and associate along with various markers such as time, date and/or location. The user may specify a type of display for a digital diary such as text, media, map, calendar and/or chart for example. In addition, the user profile module(s) 142 may comprise user specific security information for one or more users.

The internal and/or external storage module(s) 144 may be on board the multi-media device 110 and/or may reside on a connected and/or networked device. The internal and/or external storage module(s) 144 may be implemented utilizing any suitable storage media. In an exemplary embodiment of the invention, a portion of the digital diary information may be stored locally in non-volatile memory on the multi-media device 110, a portion may be stored in a database on a networked device while additional information may be accessed and downloaded as needed for digital diary output and/or a user request. In this regard, the multi-media device 110 may maintain pointers and/or designations to locally and/or remotely stored information. Moreover, pointers and/or designations may be updated when data is moved. In addition, pointers and/or metadata may be attached to media data, transaction data, location data and/or any other digital diary data.

The processor module(s) 148 may comprise one or more general purpose and/or special purpose processors or hardware modules. For example, the processor module(s) 148 may comprise a CPU, one or more co-processors and/or one or more digital signal processors and/or accelerators. In this regard, the processors may execute a digital diary application comprising one or more software modules. In an exemplary embodiment of the invention, the digital diary comprises software that may be executed on server. In this regard, the digital diary may be accessed remotely and/or output may be viewed on a handheld device for example.

Figure 1B:
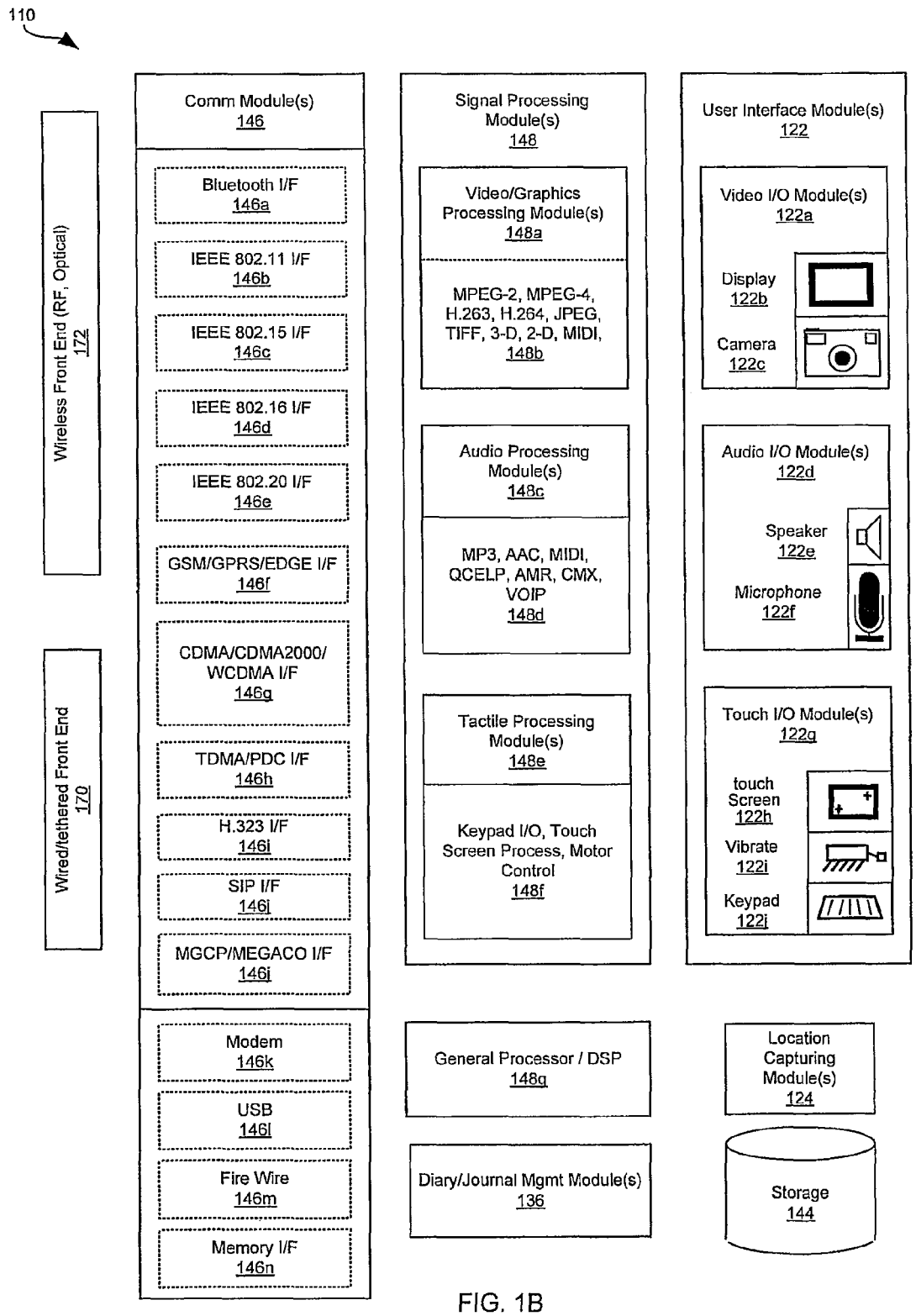
FIG. 1B is a block diagram of an exemplary multi-media device enabled to create and/or manage a digital diary, in accordance with an embodiment of the invention.

FIG. 1B is a block diagram of an exemplary multi-media device enabled to create and/or manage a digital diary, in accordance with an embodiment of the invention. Referring to FIG. 1B, there is shown, a multimedia device 110 which may comprise a plurality of communication modules 146, a plurality of processors 148, a plurality of interface modules 122, location capture module(s) 124, diary management module(s) 136, internal and/or external storage module(s) 144, a wired and/or tethered front-end 170 and a wireless front-end 172.

The multi-media device 110 shown in FIG. 1B may be similar or substantially the same as the device 110 described with respect to FIG. 1A. In this regard, the multi-media device 110 may comprise the communication module 146 described with respect to FIG. 1A, which may comprise a Bluetooth interface 146a, IEEE 802.11 interface 146b for wireless local area network (WLAN) communications, IEEE 802.14 interface 146c wireless, personal area network (PAN), IEEE 802.16 interface 146d wireless broadband metropolitan networks, IEEE 802.20 interface 146e mobile broadband wireless access (MBWA) for IP based networks. In addition, the communication module 146 may comprise wireless technologies such as GSM, GPRS, EDGE and/or UMTS interface 146f, CDMA, CDMA 2000, and/or WCDMA interface 146g, TDMA and/or personal digital cellular (PDC) interface 146h. The communication module 146 may comprise may also support H.323 interface 146i voice and/or video over IP, session initiation protocol (SIP) 146j, media gateway control protocol (MGCP) and/or gateway control protocol MEGACO interface 146k, a modem 146I, universal serial bus interface (USB) 146m and/or a memory interface 146n.

The processors 148 may be similar or substantially the same as the processors 148 described with respect to FIG. 1A. In this regard the processors 148 may comprise video and/or graphics processing module(s) 148a which may be enabled to process, for example, MPEG-2, MPEG-4, H.263, H.264, JPEG, TIFF, 3-D, 2-D, MIDI files 148b. In addition, the processors 148 may comprise a tactile and processing module 148e which may be enabled to process keypad I/O, touch screen and/or motor control information 148f. In addition, the processors 148 may comprise a general purpose processor and/or digital signal processor (DSP) 148f.

The user interface module 122 may be similar or substantially the same as the user interface module 122 described with respect to FIG. 1A. In this regard, the user interface module 122 may comprise a video input/output module 122a with a display 122b and camera 122c. In addition, the user interface module 122d may comprise an audio input/output module, a speaker 122e and/or a microphone 122f. Moreover, the user interface module 122 may comprise a touch input/output module 122h, a vibration output module 122i and/or a keypad 122j.

The location capture module(s) 124, diary management module(s) 136 and internal and/or external storage module(s) 144 may be similar and/or substantially the same as the diary management module(s) 136 and internal and/or external storage module(s) 144 described with respect to FIG. 1A.

The wired and/or tethered front-end 170 and the wireless front-end 172 may comprise may comprise suitable logic, circuitry and/or code including a plurality of physical connectors that is configured for transmission and/or reception of information from or to the communication modules 146a through 146n.

In operation, a digital diary may be generated within a multi-media device 110 and/or digital diary system 100. In this regard, data, for example, multi-media data may be captured via the camera 122c and/or microphone 122f. In addition, text, transaction data, time, date and/or location data may be captured by the keypad 122j, transaction capture module(s) 112, time/date capture module(s) 128 and/or location capture module(s) 124 respectively. Captured data may be stored internally and/or externally and/or may be identified by pointers and/or designations. The captured data may be associated with other data utilizing, for example, tags and/or metadata. Digital diary output may be conveyed to a user utilizing, for example, multi-media output such as text, audio, photos or video, maps and/or charts that may be interactive, for example. In this regard a user may access information associated with displayed information via links and/or icons via the touch screen 122h for example. A user may specify various aspects of digital diary generation and/or output. An exemplary digital diary may comprise a travel diary from a user's personal vacation. In this regard, a map may be displayed indicating a route taken while traveling on vacation and may provide links to sights of interest, hotels and/or restaurants visited. In addition, the diary may comprise commercial transaction records such as from credit card usage at the visited sites. Moreover, the map may provide links to the commercial transaction records and/or to websites of the visited sites. The map may also provide links to any other information associated with items in the travel diary and/or mapped locations, for example, times, dates, photos and/or multi-media recordings, email messages, audio or voice files, contact information and user provided information. Moreover, output from the digital diary may be organized into one or more reports.

Figure 2:
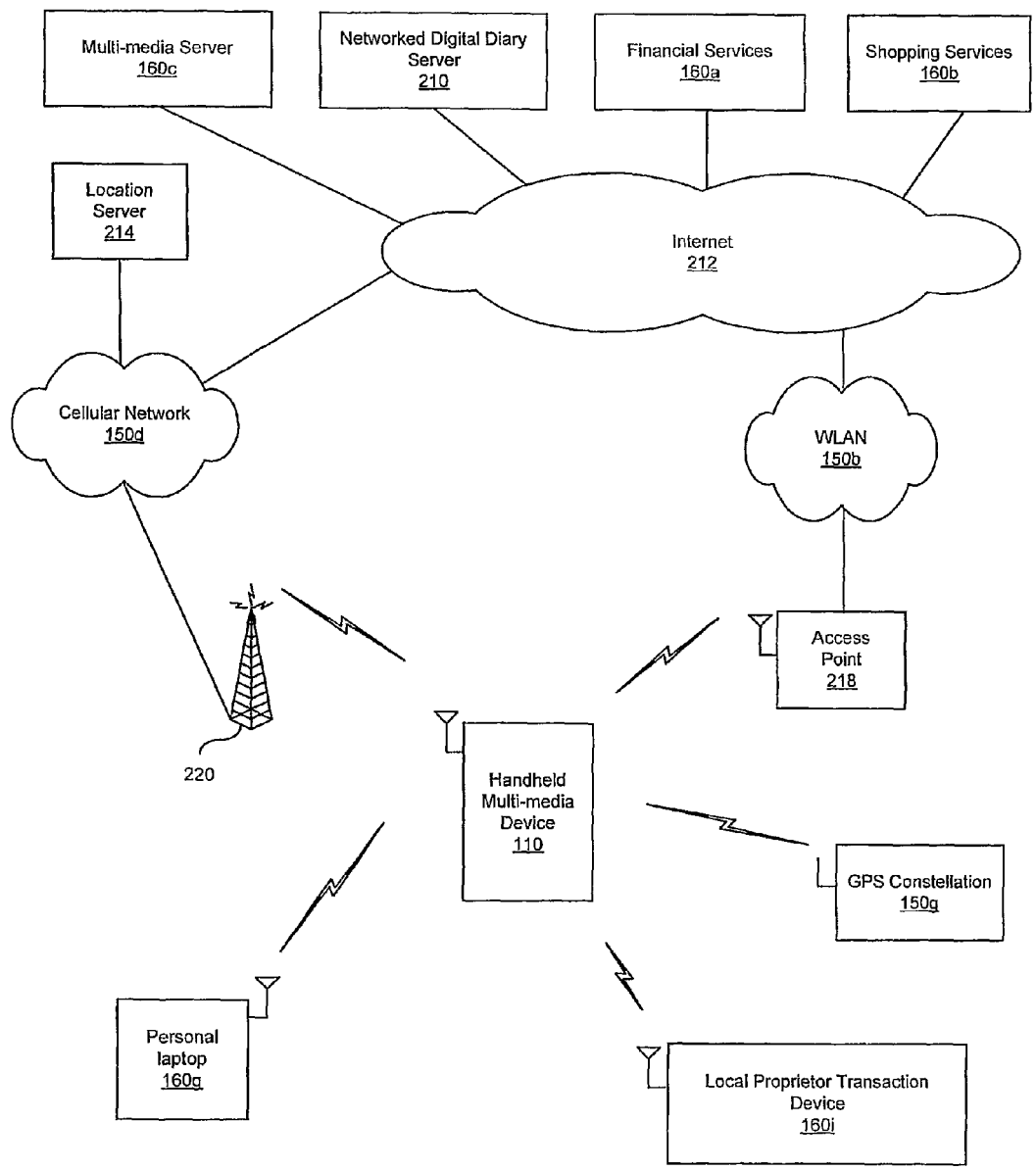
FIG. 2 is a block diagram of exemplary multi-media device enabled to communicate information to and/or from other devices, in accordance with an embodiment of the invention.

FIG. 2 is a block diagram of exemplary multi-media device enabled to communicate information to and/or from other devices, in accordance with an embodiment of the invention. Referring to FIG. 2, there is shown the multi-media device 110, the multi-media server 160c, a networked digital diary server 210, the financial services 160a, the shopping services 160b, the Internet 212, the cellular network 150d, a location server 214, a cellular base station 220, the WLAN 150b, an access point 218, a GPS satellite network 150g, the local transaction source 160i and the personal/family source 160g.

A plurality of the devices and/or services shown in FIG. 2, for example, the multi-media device 110, multi-media server 160c, financial services 160a, shopping services 160b, cellular network 150d, WLAN 150b, GPS satellite network 150g and local transaction source 160i may be similar or substantially the same as the respectively numbered devices and/or services shown in FIG. 1A. In addition, the networked digital diary server 210 may store digital diary information and/or applications that may be downloaded to the multi-media device 110. For example, the multi-media device may access the networked digital diary server 210 upon activation of a digital diary application on the multi-media device 110 and/or may retrieve data from the networked digital diary server based on a request from a user or local application for example.

The Internet 212 may provide access to a plurality of servers that the multi-media device may access for information and/or transactions. For example, a user may purchase and/or download multi-media files from the multi-media server 160c, may execute banking transactions with the financial services 160a and/or may purchase products and/or services from the shopping services 160b via the Internet 122. In this regard, the purchases and/or acquisitions of data may be recorded and may be time, date and/or location stamped for the user's digital diary. Moreover, a connection to the plurality of servers accessible via the internet 212 may be made via one or more of a plurality of networks. For example, the multi-media device 110 may access the Internet 212 via a wireless connection with an access point 218 and a WLAN and/or via a wireless connection with the cellular base station 220 and the cellular network 150d.

In operation, the multi-media device 110 may capture, store and/or identify information for one or more users and/or may utilize the information for creating and/or updating digital diary records. In addition, the multi-media device 110 may present digital diary information to a user in one or more of a plurality of ways. In this regard, the multi-media device 110 may access a plurality of devices and/or networks to store and/or retrieve data for the digital diary. For example, the multi-media device may retrieve data from and/or store data on, for example, the multi-media server 160c, the networked digital diary server 210, the financial services 160a and/or shopping services 160*b* via the internet 212. In addition data may be exchanged between the multi-media device 110 and one or more local devices. For example, a local device may be the personal/family source 160*g* which may be a personal laptop enabled to exchange data with the multi-media device 110 via a Bluetooth 146*a*, ZigBee or WLAN connection, for example. Moreover, an exemplary local transaction source 160*i* may be a payment transaction device in a restaurant that may enable the multi-media device 110 to record a credit, debit and/or other electronic financial transaction.

In various embodiments of the invention, the multimedia device may obtain location, time and/or date information from the GPS satellite network 150*g*. Accordingly, the location server 214 which may be accessible via the cellular network 150*d* may assist in determining time, date and/or location or may take the place the GPS satellite network 150*g* when GPS data may not be available. In this regard, the multi-media device 110 may stamp digital diary information with corresponding time, date and/or location information.

Figure 3:
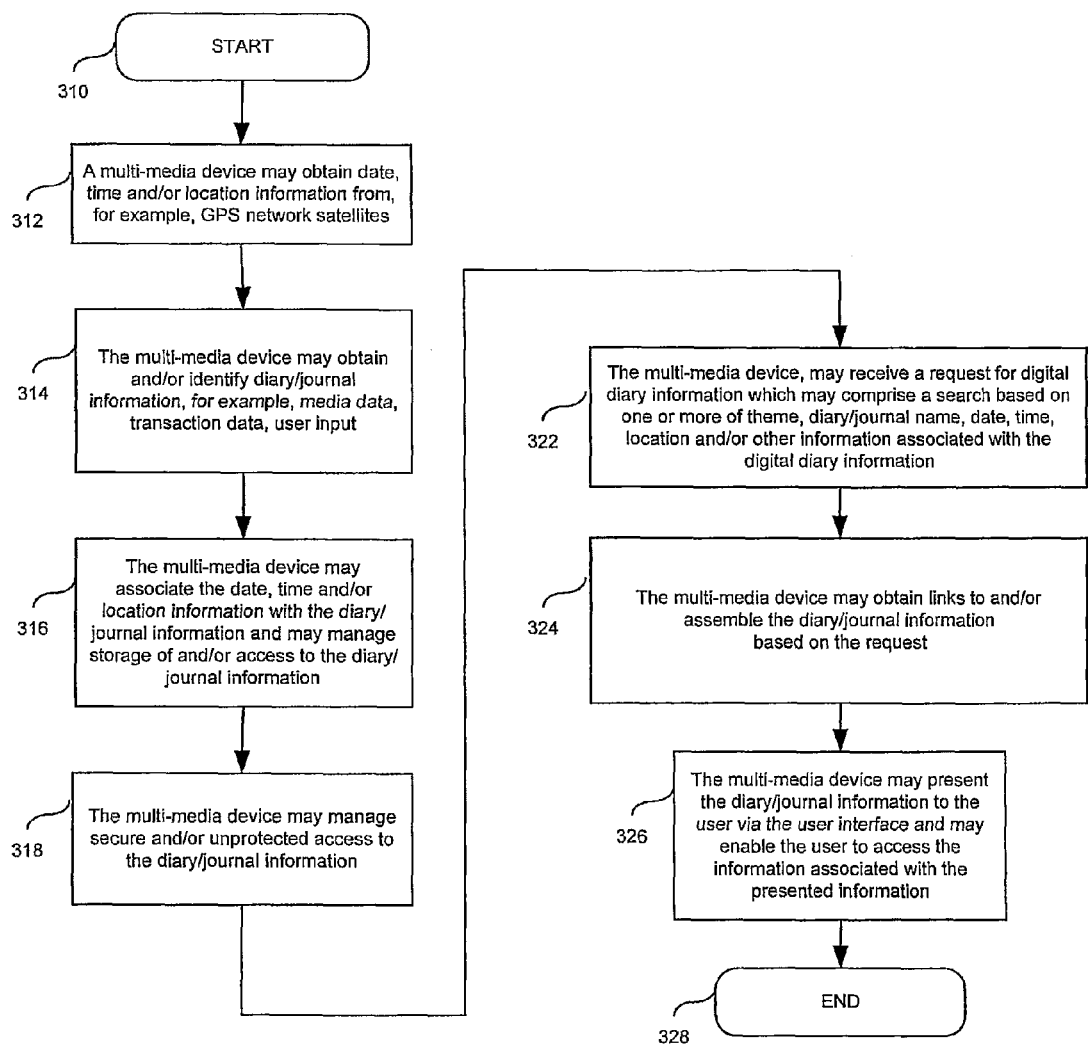
FIG. 3 is a flow chart illustrating exemplary steps for managing a digital diary, in accordance with an embodiment of the invention.

FIG. 3 is a flow chart illustrating exemplary steps for managing a digital diary, in accordance with an embodiment of the invention. Referring to FIG. 3, after start step 310, in step 312, a multi-media device 110 may obtain date, time and/or location information from, for example, GPS network satellites 150*g*. In step 314, the multi-media device 110 may obtain and/or identify diary information, for example, media data, transaction data, user input. In step 316, the multi-media device 110 may associate the date, time and/or location information with the diary information and may manage storage of and/or access to the diary information. In step 318, the multimedia device 110 may manage secure and/or unprotected access to the diary information. In step 322, the multi-media device 110 may receive a request for digital diary information which may comprise a search based on one or more of criteria comprising theme, diary name, date, time, location and/or other information associated with the digital diary information. In step 324, the multi-media device 110 may obtain links to and/or assemble the diary information based on the request. In step 326, the multi-media device 110 may present the diary information to the user via the user interface 122 and may enable the user to access the information associated with the presented information.

In an embodiment of the invention, a wireless communication device 110 may generate process and/or provide links to multimedia information. In addition, the wireless communication device 110 may be operable to determine or identify its location, for example, a location where the generation of multi-media and/or processing occurs or a location associated with the multi-media information. Moreover, the wireless communication device 110 may generate an interactive digital diary that may comprise one or more digital diary records. Accordingly, digital diary records may be generated based on default settings, a stored user profile and/or ad hoc user input, for example. The interactive digital diary may associate and/or link the generated, processed and/or linked multi-media information with the determined location information and/or a transaction, for example. The digital diary records may comprise, for example, associated moving images, still images, voice, audio, text, geographic location, entity information, time, date, transactions, financial information, consumer information, security information, user input, communications, links, user contacts, software applications, user profiles, scheduled events, prompts and/or reminders. Furthermore, information for the digital diary records may be stored within the wireless communication device, for example in storage 144 and/or external to it, for example, within the multi-media server 160*c*, the networked digital diary server 210, the financial services 160*a* and/or the shopping services 160*b*.

In various embodiments of the invention, a user interface 122, which may be presented on a display of the wireless communication device 110, may be operable to display the interactive digital diary 122. In this regard, various digital diary records and/or links associated with the digital diary records may be presented within various contexts, for example, within maps, time frames, narrative, collage, voice, audio, video, text, data, icons, charts, and tables. The time frames may comprise calendars and/or time lines for example. Also, the user interface 122 may enable display of one or more links and/or icons that may provide access to one or more external entities, for example financial services 160*a*, shopping services 160*b*, multi-media services 160*c*, government services 160*d*, and medical services 160*e*. In addition, link access may be provided to a plurality of networks, servers, applications and contacts. For example, the user interface may display a map of digital diary information wherein icons and/or hyperlinks may enable users to access additional information associated with the corresponding digital diary record. Moreover, the user interface 122 may also provide links to web servers, for example, via the Internet 212 or to contacts associated with the digital diary record. In this manner, associating and/or linking information for the interactive digital diary may utilize metadata, tags and/or designations. User input via the user interface 122 may comprise one or more of a plurality of methods, for example, screen touch, pressure sensor, key entry and voice.

In accordance with an embodiment of the invention, information for the digital diary records may be communicated and/or updated via one or more of a plurality of wireless, optical and/or wired communication technologies such as 150*a* through 150*g*. In addition, digital diary records may be searchable based on one or more criteria comprising time, date, geographic location, entity, contact and user identity, for example. Access to the digital diary records may involve authentication and communication of digital diary records may involve encryption and/or decryption. Multi-media, which may comprise audio, still and/or moving images and text for example, may be captured utilizing one or more of a camera 122*c*, microphone 122*f*, geo-location data receiver 124, transaction write/reader 112, digital clock, digital calendar, key entry 122*j*, tactile sensor 122*h*. In various embodiments of the invention, financial and/or security transactions based on one or more digital diary records may be executed within said interactive digital diary and/or wireless communication device 110. The interactive digital diary may enable a user to capture, process, access and/or update a personal history of activity with a wireless communication device 110.

Another embodiment of the invention may provide a machine and/or computer readable storage and/or medium, having stored thereon, a machine code and/or a computer program having at least one code section executable by a machine and/or a computer, thereby causing the machine and/or computer to perform the steps as described herein for a method and system for a digital diary system.

Accordingly, aspects of the invention may be realized in hardware, software, firmware or a combination thereof. The invention may be realized in a centralized fashion in at least one computer system or in a distributed fashion where different elements are spread across several interconnected computer systems. Any kind of computer system or other apparatus adapted for carrying out the methods described herein is suited. A typical combination of hardware, software and firmware may be a general-purpose computer system with a computer program that, when being loaded and executed, controls the computer system such that it carries out the methods described herein.

One embodiment of the present invention may be implemented as a board level product, as a single chip, application specific integrated circuit (ASIC), or with varying levels integrated on a single chip with other portions of the system as separate components. The degree of integration of the system will primarily be determined by speed and cost considerations. Because of the sophisticated nature of modern processors, it is possible to utilize a commercially available processor, which may be implemented external to an ASIC implementation of the present system. Alternatively, if the processor is available as an ASIC core or logic block, then the commercially available processor may be implemented as part of an ASIC device with various functions implemented as firmware.

The present invention may also be embedded in a computer program product, which comprises all the features enabling the implementation of the methods described herein, and which when loaded in a computer system is able to carry out these methods. Computer program in the present context may mean, for example, any expression, in any language, code or notation, of a set of instructions intended to cause a system having an information processing capability to perform a particular function either directly or after either or both of the following: a) conversion to another language, code or notation; b) reproduction in a different material form. However, other meanings of computer program within the understanding of those skilled in the art are also contemplated by the present invention.

While the invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiments disclosed, but that the present invention will include all embodiments falling within the scope of the appended claims.

The methods, devices, and logic described above may be implemented in many different ways in many different combinations of hardware, software or both hardware and software. For example, all or parts of the system may include circuitry in a controller, a microprocessor, or an application specific integrated circuit (ASIC), or may be implemented with discrete logic or components, or a combination of other types of analog or digital circuitry, combined on a single integrated circuit or distributed among multiple integrated circuits. All or part of the logic described above may be implemented as instructions for execution by a processor, controller, or other processing device and may be stored in a tangible or non-transitory machine-readable or computer-readable medium such as flash memory, random access memory (RAM) or read only memory (ROM), erasable programmable read only memory (EPROM) or other machine-readable medium such as a compact disc read only memory (CDROM), or magnetic or optical disk. Thus, a product, such as a computer program product, may include a storage medium and computer readable instructions stored on the medium, which when executed in an endpoint, computer system, or other device, cause the device to perform operations according to any of the description above.

The processing capability of the system may be distributed among multiple system components, such as among multiple processors and memories, optionally including multiple distributed processing systems. Parameters, databases, and other data structures may be separately stored and managed, may be incorporated into a single memory or database, may be logically and physically organized in many different ways, and may implemented in many ways, including data structures such as linked lists, hash tables, or implicit storage mechanisms. Programs may be parts (e.g., subroutines) of a single program, separate programs, distributed across several memories and processors, or implemented in many different ways, such as in a library, such as a shared library (e.g., a dynamic link library (DLL)). The DLL, for example, may store code that performs any of the system processing described above. While various embodiments of the invention have been described, it will be apparent to those of ordinary skill in the art that many more embodiments and implementations are possible within the scope of the invention. Accordingly, the invention is not to be restricted except in light of the attached claims and their equivalents.

What is claimed is:

1. A method for a digital diary system, the method comprising:
at a wireless communication device,
storing in a memory digital diary information of a user of the wireless communication device;
automatically capturing a financial transaction conducted by the wireless communication device or the user of the wireless communication device; and
updating the stored digital diary information using the captured financial transaction.

2. The method of claim 1 wherein updating the stored digital diary information comprises:
storing in the memory one or more digital diary records including storing multimedia information along with transaction information about the captured financial transaction.

3. The method of claim 2 wherein storing one or more digital diary records comprises storing information about a product, a service, a price, a vendor, parties or entities involved, tax information, an account number, security information, time, date or location of the captured financial transaction.

4. The method of claim 2 wherein updating the stored digital diary information comprises:
linking a plurality of stored digital diary records according to a specified theme or a shared factor.

5. The method of claim 1 further comprising:
determining location information of the captured financial transaction; and
storing a digital diary record for the captured financial transaction along with the location information.

6. The method of claim 1 further comprising:
determining time and date information of the captured financial transaction; and
storing a digital diary record for the captured financial transaction along with the time and date information.

7. The method of claim 1 further comprising:
displaying a user interface on a display of the wireless communication device; and
presenting user interactive information of the digital diary information on the user interface.

8. The method of claim 7 further comprising:
accepting user input via a touch screen of the user interface; and
modifying a digital diary record stored in the memory in response to the user input.

9. The method of claim 1 wherein storing the digital diary information in the memory comprises storing at least part of the digital diary information in a network memory remote from the wireless communication device.

10. The method of claim 1 further comprising:
receiving from the user, through a user interface of the wireless communication device, search criteria;
searching digital diary records stored in the memory for records matching the search criteria; and
presenting through the user interface the matching records.

11. A wireless communication device comprising:
memory to store data and instructions;
a processor in data communication with the memory and responsive to the stored data and instructions to control the wireless communication device;
a diary management module operative to organize digital diary information for accessing, updating, outputting and processing of the digital diary information, the digital diary information including a plurality of digital diary records stored in the memory by the diary management module;
a transaction capture module operative to automatically capture commercial transactions that a user of the wireless communication device may conduct; and
a user interface module operative to accept user input and provide user information to the user of the wireless communication device, the user input for use in a digital diary record of the plurality of digital diary records or for linking various digital diary information according to user-specified factors, the user input controlling the user interface module to modify a digital diary record stored in the memory in response to the user input.

12. The wireless communication device of claim 11 further comprising:
a communication module configured for wireless communication of data including digital diary data with one or more remote data resources.

13. The wireless communication device of claim 12 further comprising:
an external information source module configured to automatically seek availability of updated digital diary data from a remote data resource,
receive the updated diary data when available, and
update appropriate digital diary records stored in the memory with the updated diary data.

14. The wireless communication device of claim 12 further comprising:
a multi-user management module configured to provide access to the digital diary information stored in the memory of the wireless communication device by a plurality of users of the wireless communication device.

15. The wireless communication device of claim 14 wherein the multi-user management module is configured to tailor digital diary functionality of the wireless communication device to each respective user of the plurality of users of the wireless communication device.

16. The wireless communication device of claim 11 further comprising:
a location capture module operable to acquire location information, wherein the wireless communication device is operative to link the acquired location information with items of the digital diary information.

17. A method comprising:
at a wireless communication device, receiving user input at a user interface to define digital diary information;
storing the digital diary information as one or more digital diary records in a memory of the wireless communication device;
determining a location associated with the user input;
storing location information for the determined location in a digital diary record;
automatically capturing a financial transaction involving the wireless communication device;
automatically determining a location of the captured financial transaction; and
automatically updating the digital diary information when some or all of the digital diary information has become obsolete or new information associated with digital diary information is available, including updating the stored digital diary information with information about the captured financial transaction and the location of the captured transaction.

18. The method of claim 17 further comprising:
receiving multimedia data at the wireless communication device; and
based on content of the received multimedia data, updating the stored digital diary information.

19. The method of claim 17 further comprising:
automatically capturing a credit card purchase as the captured financial transaction involving the wireless communication device;
automatically determining a location of the captured credit card purchase; and
updating the stored digital diary information with information about the captured credit card purchase and the location of the captured credit card purchase.

20. The method of claim 19 further comprising:
based on user input, grouping a plurality of digital diary records of the one or more digital diary records, the grouping being according to a shared factor of the plurality of digital diary records.

* * * * *